April 2, 1929.   W. DAVIS   1,707,299
DUAL CONTROLLING DEVICE FOR MOTOR VEHICLES
Filed Jan. 6, 1927
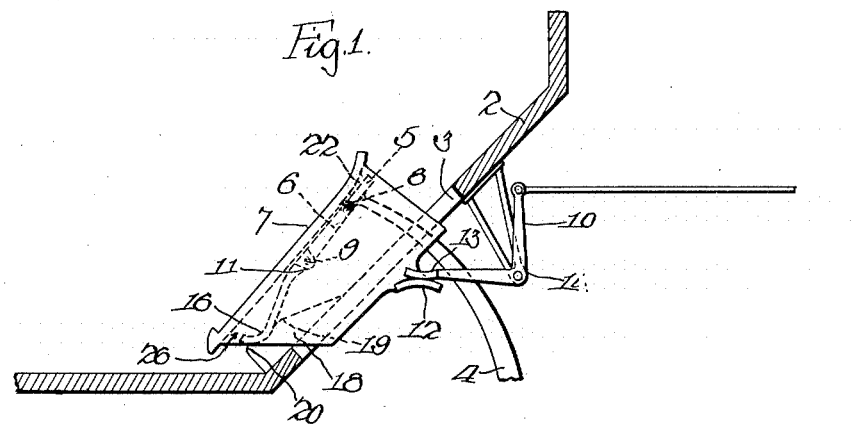
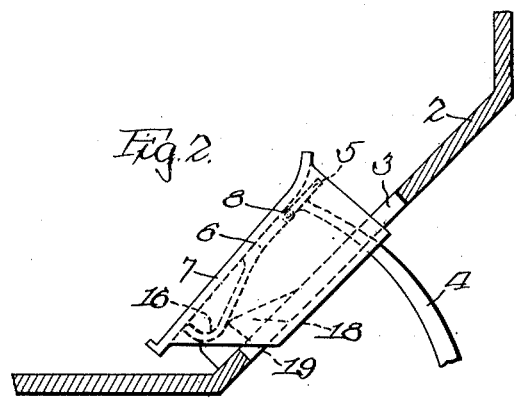
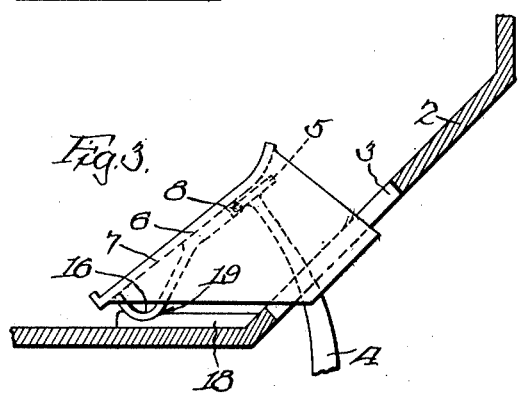

Patented Apr. 2, 1929.

1,707,299

UNITED STATES PATENT OFFICE.

WILLIAM DAVIS, OF CHICAGO, ILLINOIS.

DUAL CONTROLLING DEVICE FOR MOTOR VEHICLES.

Application filed January 6, 1927. Serial No. 159,263.

My invention relates to controlling mechanism for motor vehicles and more particularly to the type of pedal control disclosed in United States Letters Patent Number 1,549,348 granted to me on August 11, 1925.

One of the objects of the invention is to provide an improvement over my previous device by the provision of a simpler, less expensive and easier operated pedal control.

While I shall describe my invention as being particularly adapted to a pedal control for motor vehicles for actuating such controls thereof as the accelerator, clutch and brake, it is obvious that the essential features of the invention need not be limited to this use solely, but may be employed elsewhere whether in analogous or non-analogous arts.

A further object of the invention is to provide a pedal control for a clutch or brake, which permits the driver's foot to rest upon the pedal, while not in operation, without necessarily riding the clutch or brake, which has heretofore been found damaging, causing these parts to rapidly wear and be less effective when operated.

A still further object of the invention is to associate in a simple manner, a connection leading to the accelerator with a pedal control of the above type, whereby the accelerator and the clutch may be alternately actuated by this pedal.

I contemplate providing means, which will guide the device in its movement, by passing this means through the usual slot in the foot board. This means may also act as a shield to protect the side of the device from the foot should it accidentally slip from the pedal.

Moreover, an important feature of my invention resides in the provision of a rest for the support carrying the foot pedal. In order to provide parallel movement to the pedal, which is desirable when actuating the control elements, high spots or humps are formed on the rest, so that, as the pedal is depressed in either direction, the lower end of the pedal support rides thereover.

Other objects and advantages of my invention will be apparent when taken in connection with the accompanying drawings which form a part thereof.

In the drawings:

Figure 1 is a side elevation of the controlling mechanism illustrating its application to a floor board of a motor vehicle;

Fig. 2 is a similar view, but illustrating the controlling mechanism connected to a clutch pedal only; and Fig. 3 is also a similar view, but in this instance illustrating a brake pedal connected to the controlling mechanism.

The invention is illustrated as applied to a motor vehicle wherein the usual foot or sloping floor board 2 is provided with a vertically disposed slot 3 through which a control element 4 projects. In this instance, control element 4 may be the usual clutch pedal having a head 5 carried at the upper free end. A pedal support 6, preferably a flat integral member is adapted to have the clutch pedal head 5 pivotally connected thereto at 8. A pedal 7 contacts preferably at 8 with the pedal support 6, so that forward movement of the foot of the driver will tilt the pedal about a fulcrum point 9 and thereby depress the clutch pedal.

Pedal 7 is fulcrumed to the pedal support 6, at the point 9, at a suitable distance below the upper contact point 8. It will be remembered that the device, as shown in Fig. 1, is intended to be used to operate two control elements of the motor vehicle. In addition to operating the clutch pedal, as above described, I contemplate the provision of means which will also operate an accelerator control 10 of the vehicle. However, the advantages of this invention may be obtained, as I shall hereinafter point out in connection with Figs. 2 and 3, where only one control is employed.

A bracket 11, provided in the form of a plate, extends inwardly or rearwardly toward the floor board 2 and projects slightly through through slot 3. An arcuate engaging portion 12 formed on bracket 11 is adapted normally to engage a portion 13 carried by a bell-crank lever 14 of accelerator control 10. The arrangement is such that the portions 12 and 13 normally engage with each other, but will be separated to prevent operation of the accelerator control 10 when pedal 7 is tilted about its fulcrum 9 to operate clutch pedal 4. However, the pedal 7 raises portion 12 to operate the accelerator control 10 by raising portion 13 when the pedal is tilted or depressed downwardly at its lower end about its fulcrum 9. Obviously, then, there is no possibility of the pedal accidentally operating both controls at the same time, or the wrong control, even though the foot of the driver should slip while on the pedal or while holding the pedal depressed at either end.

It is obvious to those skilled in the art that it is desirable for the pedal 7, when moving about fulcrum point 9, to maintain a substantially parallel position with respect to the floor board 2. To accomplish this result, the pedal support 6 is extended at its lower end and formed with a curved portion 16, which is normally adapted to lie in a correspondingly formed groove 17 furnished in the upper face of a rest 18 secured to floor board 2 adjacent to slot 3. It will be observed that high spots 19 and 20, resulting from the formation of groove 16, causes the curved portion 16 to raise the lower end of pedal support 6 as it is carried with pedal 7 when tilted about either point 8 or 9, thereby also raising the pedal, either at the upper or lower end depending upon whether it is tilted at fulcrum 9, to compensate for such tilting and to keep the pedal held substantially in a parallel plane. I consider this feature of the invention of great importance, particularly in a pedal controlling mechanism adapted to operate more than one control.

A further advantage of the construction resides in the ability of the driver to allow his foot normally to rest on the pedal while neither control is being operated. When the vehicle is running and no speed changing is being effected, the clutch will not be operated, while, on the other hand, the driver may not be employing the foot accelerator control to feed fuel to the motor. Notwithstanding, the driver will not be required to remove his foot from the pedal, because the construction renders it impossible for his foot to ride the clutch. By permitting the foot to rest on the pedal, the operation of the vehicle is rendered safer and easier, as the foot is continuously on the pedal and can operate it instantly when required.

It will be observed that the head 5 of clutch pedal 4 does not normally engage the pedal 7. A clearance, indicated at 22, is provided so that normally resting the foot on the pedal, as above explained, does not permit riding of the clutch.

I find that it is desirable to employ the bracket 11 as a plate which protects the side of the control mechanism from the foot of the driver in the event it accidentally slips from the pedal. At the same time, it may serve as a guide for the pedal, as it passes through slot 3 and may ride against one side of the slot and accordingly may be steadied.

In Figs. 2 and 3 I have illustrated my invention applied to a single control. In either instance, this control may be a clutch lever or a brake lever. In Fig. 2, the clearance 26 furnished between the lower ends of the pedal support 6 and the pedal 7 to permit operation of the accelerator control 10, is omitted. In Fig. 3, the foot rest 18 is placed on the horizontal portion of the floor board, but, in either case, I contemplate utilizing means, such as the high spot 19 for effecting substantially parallel movement of the pedal when being tilted or depressed about fulcrum 9. I also contemplate employing the curved lower portion 16 on the pedal support 6 and allowing it normally to lie in a similarly formed groove in rest 18, to permit the foot to rest on the pedal without riding the clutch or brake lever controlled thereby. The bracket or plate 11 is also used in these instances to act as a protective shield for the side of the structure and also as a guide as above explained.

From the foregoing description, it will be obvious that many changes may be made in the structure herein disclosed, without departing from the spirit and scope of my invention.

I claim:

1. In a device of the class described, the combination of a pedal support, a pedal contacting at two points on said pedal support, one of said contacting points serving as a fulcrum for said pedal, a rearwardly extending bracket on said pedal having a surface normally engaging and actuating a control element when said pedal is tilted forwardly about its fulcrum point, and a pivotal connection at the other contacting point for a second control element normally lying out of contact under said pedal but movable by the pedal when the latter is tilted forwardly at its fulcrum point.

2. In a device of the class described, the combination of a pedal support, a pedal contacting at two points on said pedal support, one of said contacting points serving as a fulcrum for said pedal, a rearwardly extending bracket on said pedal having a portion normally engaging and actuating a control element when said pedal is tilted downwardly at its lower end about its fulcrum point, a second control element engageable by said pedal when the pedal is tilted forwardly at its upper end about the fulcrum point, and a rest for the lower end of said pedal support, said rest having raised portions to cause said lower end of the pedal support to ride thereover whereby to maintain said pedal in a substantially parallel plane throughout its tilting movements.

3. In a device of the class described, the combination of a pedal support, a pedal contacting at two points on said support, one of said contacting points serving as a fulcrum for said pedal, a floor board having a slot therein, a control element protruding through said slot and connecting to said pedal support, a second control element, and a plate-like bracket extending downwardly along one side of said pedal and into said slot to operate said second control element.

4. In a device of the class described, the combination of a pedal support, a pedal contacting at two points on said support, one of said contacting points serving as a fulcrum for said pedal, a floor board having a slot therein, a control element protruding through said slot and connecting to said pedal support adjacent to one of said contacting points, a second control element disposed at the rear of said floor board, and means extending rearwardly from said pedal and through said slot operably to engage said second control.

5. In a device of the class described, the combination of a pedal support, a pedal fulcrumed thereto, a control element operably connected to said pedal, and a rest having a groove therein for receiving a portion of said pedal support whereby normally to allow the foot of the operator to rest on said pedal without transmitting pressure to said control element.

6. In a device of the class described, the combination of a pedal support, a pedal fulcrumed thereto, a control element operably connected to said pedal, a rest for receiving a portion of said pedal support, and compensating means on said rest for raising the lower end of said pedal support as it rides thereover whereby to maintain a substantially parallel movement of said pedal as it tilts about said fulcrum.

In witness whereof, I have hereunto subscribed my name.

WILLIAM DAVIS.